United States Patent
Yoon et al.

(10) Patent No.: US 11,531,866 B2
(45) Date of Patent: Dec. 20, 2022

(54) CLUSTERING METHOD AND APPARATUS USING RANKING-BASED NETWORK EMBEDDING

(71) Applicant: ELECTRONICS AND TELECOMMUNICATIONS RESEARCH INSTITUTE, Daejeon (KR)

(72) Inventors: Yeo Chan Yoon, Seoul (KR); Hyeon Jin Kim, Gwangmyeong-si (KR); Soo Myung Park, Seoul (KR); Hyung Keun Jee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 592 days.

(21) Appl. No.: 16/659,912

(22) Filed: Oct. 22, 2019

(65) Prior Publication Data

US 2021/0081768 A1 Mar. 18, 2021

(30) Foreign Application Priority Data

Sep. 16, 2019 (KR) .................. 10-2019-0113395

(51) Int. Cl.
- *G06K 9/62* (2022.01)
- *G06V 30/40* (2022.01)
- *G06N 3/04* (2006.01)
- *G06N 3/08* (2006.01)

(52) U.S. Cl.
CPC ......... *G06N 3/0472* (2013.01); *G06K 9/6218* (2013.01); *G06N 3/08* (2013.01); *G06V 30/40* (2022.01)

(58) Field of Classification Search
CPC ........ G06N 3/0472; G06N 3/08; G06N 3/088; G06K 9/6218; G06K 9/6271; G06V 30/40; G06V 10/82
See application file for complete search history.

(56) References Cited

U.S. PATENT DOCUMENTS

| | | |
|---|---|---|
| 8,156,056 B2 | 4/2012 | Luege Mateos |
| 8,311,960 B1 | 11/2012 | Ginzburg et al. |
| 9,053,391 B2 | 6/2015 | Wang et al. |
| 9,400,834 B2 | 7/2016 | Davies |
| 9,582,835 B2 | 2/2017 | Yoon et al. |
| 10,095,769 B2 | 10/2018 | Safovich et al. |
| 2015/0161517 A1 | 6/2015 | Bae et al. |
| 2015/0262033 A1 | 9/2015 | Chen et al. |
| 2017/0132510 A1 | 5/2017 | Paluri et al. |
| 2018/0182376 A1* | 6/2018 | Van Gysel ............. G10L 21/10 |
| 2018/0285176 A1* | 10/2018 | Mozhaev ............. G06F 16/951 |

(Continued)

*Primary Examiner* — Ming Y Hon
(74) *Attorney, Agent, or Firm* — LRK Patent Law Firm

(57) ABSTRACT

A clustering method includes configuring a network with clustering target objects; collecting significance of the clustering target objects; performing network embedding for outputting a set of vectors representing neighboring objects of the clustering target objects constituting the network using a neural network; and performing clustering on the clustering target objects using the set of vectors and information on each of the clustering target objects, wherein the neural network is trained so that neighboring objects having high significance are output with higher probability.

14 Claims, 5 Drawing Sheets

(56) References Cited

U.S. PATENT DOCUMENTS

| | | | | |
|---|---|---|---|---|
| 2018/0357511 | A1* | 12/2018 | Misra | G06K 9/6215 |
| 2019/0155918 | A1* | 5/2019 | Jaroch | G06F 40/284 |
| 2019/0179915 | A1 | 6/2019 | Yoon et al. | |
| 2019/0205322 | A1* | 7/2019 | Dobrynin | G06F 40/186 |
| 2019/0278846 | A1* | 9/2019 | Xiang | G06F 16/90332 |
| 2019/0347540 | A1* | 11/2019 | Yim | G06K 9/6282 |
| 2019/0354595 | A1* | 11/2019 | Sabharwal | G06F 16/285 |
| 2019/0384833 | A1* | 12/2019 | Estes | G06F 16/93 |
| 2020/0143819 | A1* | 5/2020 | Delcroix | G10L 15/16 |
| 2020/0257709 | A1* | 8/2020 | Bull | G06F 16/31 |
| 2021/0044870 | A1* | 2/2021 | Li | H04N 21/252 |
| 2021/0049324 | A1* | 2/2021 | Delcroix | G06N 3/0445 |
| 2021/0110259 | A1* | 4/2021 | Lee | G06N 20/20 |
| 2021/0232948 | A1* | 7/2021 | Otsuka | G06F 16/90335 |
| 2021/0256322 | A1* | 8/2021 | Lee | G06V 10/82 |
| 2021/0272040 | A1* | 9/2021 | Johnson | G10L 25/24 |
| 2022/0092869 | A1* | 3/2022 | Abbeloos | G06V 20/70 |

* cited by examiner

CLUSTERING METHOD AND APPARATUS USING RANKING-BASED NETWORK EMBEDDING

CROSS-REFERENCE TO RELATED APPLICATION(S)

This application claims priority to Korean Patent Application No. 10-2019-0113395 filed on Sep. 16, 2019 in the Korean Intellectual Property Office (KIPO), the entire content of which is hereby incorporated by reference.

BACKGROUND

1. Field of the Invention

The present disclosure relates to a clustering technique, and more particularly, to a method and an apparatus for performing clustering on various objects such as documents by using a ranking-based network embedding.

2. Description of Related Art

Clustering is a technique for grouping of similar object (e.g., documents) into clusters. It is an approach for drawing insights and performing analyses by classifying large volumes of objects without using a prebuilt high-cost learning set. In particular, in modern times, when several millions of large digital documents are created, high-performance and quick document clustering methods have become essential.

Network-based clustering methods can classify documents quickly and effectively by analyzing significance of nodes constituting a graph based on graphs as well as the strength of the relationships between these nodes. They are being used with various types of media such as academic papers, mobile apps, and social media. The most important factor in network-based clustering is to accurately measure the significance of the object. When the object is a document, many existing studies ranked documents by analyzing their inlink and outlink information or by using a tool such as a search engine.

However, these methods cannot solve the "abusing" problem, which refers to the intentional manipulation of links or the insertion of popular words irrelevant to the actual content to increase the significance of the documents.

SUMMARY

Accordingly, exemplary embodiments of the present disclosure provide a method for performing clustering by using a ranking-based network embedding.

Accordingly, exemplary embodiments of the present disclosure also provide an apparatus for performing clustering by using a ranking-based network embedding.

According to exemplary embodiments of the present disclosure, a clustering method may comprise configuring a network with clustering target objects; collecting significance of the clustering target objects; performing network embedding for outputting a set of vectors representing neighboring objects of the clustering target objects constituting the network using a neural network; and performing clustering on the clustering target objects using the set of vectors and information on each of the clustering target objects, wherein the neural network is trained so that neighboring objects having high significance are output with higher probability.

The clustering target objects may be documents or mobile applications.

The network may be defined as G=<V, E, W>, V may be the clustering target objects belonging to the network, E may be edges representing binary relations of pairs of the clustering target objects belonging to the network, and W:E→ $\mathbb{R}^+$ may be real value weight mappings for edges e (e∈E).

The clustering may be performed using a score function proportional to a posterior probability that an object $x_i$ belongs to a cluster $C_k$, the score function may be represented by $$\text{Score}(C_k, x_i) = \frac{|V(G_k)|}{|V(G)|} \sum_{x_j \in N_{G_k}(x)} f_{RS}(x_i, x_j) \times f_{RS}(x_j, \text{Avg}(V(G_k))),$$

$N_G(x)$ may represent a set of neighboring objects $x_j$ of the object $x_i$ in the network G, $f_{RS}(x_i, x_j)$ may represent a function representing similarity and significance of the objects $x_i$ and $x_j$, $V(G_k)$ may represent objects belonging to a graph $G_k$ corresponding to the cluster $C_k$, $V(G)$ may be all objects belonging to the network G, and $f_{RS}(x_j, \text{Avg}(V(G_k)))$ may represent average similarity and significance between the object $x_i$ and the objects belonging to the graph $G_k$.

Here, $f_{RS}$ may be learned by a Net2Vec algorithm, and the Net2Vec algorithm may train the neural network by using information on the significance of the clustering target objects so as to maximize probabilities that neighboring objects having high significance are predicted.

The Net2Vec algorithm may use an authority ranking loss function to induce learning so that an object having high significance is predicted with a higher probability by giving a penalty as significance of a neighboring object of a clustering target object is lower.

The signification may be represented by an authority ranking score (ARS) function, $$ARS(x_i) = R(x_i) \times \frac{\sum_{x_j \in N_G(x_i)} R(x_j) \times sim(x_i, x_j)}{|N_G(x_i)|} = f_{RS}(x_j, \text{Avg}(V(G_k))),$$

$R(x_i)$ may be a rank score of $x_i$, $sim(x_i, x_j)$ may be a cosine similarity representing a distance between latent vectors of $x_i$ and $x_j$, and $N_G(x)$ may represent a set of neighboring objects $x_j$ of the object $x_i$ in the network G.

When the clustering target objects are mobile applications, $R(x_i)$ may be obtained through min-max normalization on a sum of reciprocals of download ranks for a given period.

Furthermore, according to exemplary embodiments of the present disclosure, a clustering apparatus may comprise at least one processor and a memory storing at least one instruction executable by the at least one processor. Also, when executed by the at least one processor, the at least one instruction may be configured the at least one processor to configure a network with clustering target objects; collect significance of the clustering target objects; perform network embedding for outputting a set of vectors representing neighboring objects of the clustering target objects constituting the network using a neural network; and perform clustering on the clustering target objects using the set of vectors and information on each of the clustering target objects, wherein the neural network is trained so that neighboring objects having high significance are output with higher probability.

The clustering target objects may be documents or mobile applications.

The network may be defined as $G=\langle V, E, W\rangle$, V may be the clustering target objects belonging to the network, E may be edges representing binary relations of pairs of the clustering target objects belonging to the network, and $W:E\rightarrow \mathbb{R}^+$ may be real value weight mappings for edges e ($e\in E$).

The clustering may be performed using a score function proportional to a posterior probability that an object $x_i$ belongs to a cluster $C_k$, the score function may be represented by $$\text{Score}(C_k, x_i) = \frac{|V(G_k)|}{|V(G)|} \Sigma_{x_j \in N_{G_k}(x)} f_{RS}(x_i, x_j) \times f_{RS}(x_j, Avg(V(G_k))),$$

$N_G(x)$ may represent a set of neighboring objects $x_j$ of the object $x_i$ in the network G, $f_{RS}(x_i, x_j)$ may represent a function representing similarity and significance of the objects $x_i$ and $x_j$, $V(G_k)$ may represent objects belonging to a graph $G_k$ corresponding to the cluster $C_k$, V(G) may be all objects belonging to the network G, and $f_{RS}(x_j, Avg(V(G_k)))$ may represent average similarity and significance between the object $x_i$ and the objects belonging to the graph $G_k$.

Here, $f_{RS}$ may be learned by a Net2Vec algorithm, and the Net2Vec algorithm may train the neural network by using information on the significance of the clustering target objects so as to maximize probabilities that neighboring objects having high significance are predicted.

The Net2Vec algorithm may use an authority ranking loss function to induce learning so that an object having high significance is predicted with a higher probability by giving a penalty as significance of a neighboring object of a clustering target object is lower.

The signification may be represented by an authority ranking score (ARS) function, $$ARS(x_i) = R(x_i) \times \frac{\Sigma_{x_j \in N_G(x_i)} R(x_j) \times sim(x_i x_j)}{|N_G(x_i)|} = f_{RS}(x_j, Avg(V(G_k))),$$

$R(x_i)$ may be a rank score of $x_i$, sin $(x_i x_j)$ may be a cosine similarity representing a distance between latent vectors of $x_i$ and $x_j$, and $N_G(x)$ may represent a set of neighboring objects $x_j$ of the object $x_i$ in the network G.

When the clustering target objects are mobile applications, $R(x_i)$ may be obtained through min-max normalization on a sum of reciprocals of download ranks for a given period.

Using the exemplary embodiments according to the present disclosure as described above, network clustering can be performed using the importance based on an external indicator of the clustering object without fear of abusing. In addition, in the exemplary embodiments according to the present disclosure, multi-labeling and non-labeling can be possible, which were not possible in the conventional clustering methods.

BRIEF DESCRIPTION OF DRAWINGS

Embodiments of the present disclosure will become more apparent by describing in detail embodiments of the present disclosure with reference to the accompanying drawings, in which.

DETAILED DESCRIPTION

Figure 1:
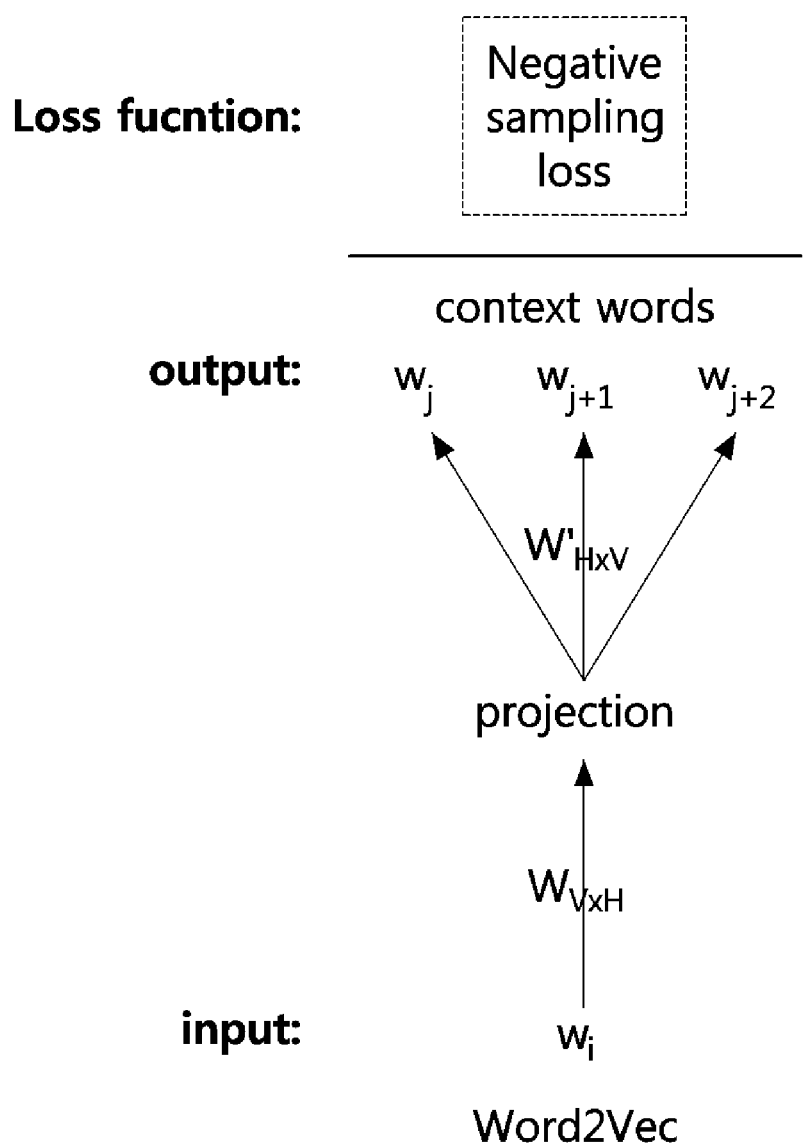
FIG. 1 is a conceptual diagram illustrating a Word2Vec algorithm.

Embodiments of the present disclosure are disclosed herein. However, specific structural and functional details disclosed herein are merely representative for purposes of describing embodiments of the present disclosure, however, embodiments of the present disclosure may be embodied in many alternate forms and should not be construed as limited to embodiments of the present disclosure set forth herein.

Accordingly, while the present disclosure is susceptible to various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

In the present disclosure, a new method for determining the importance of target objects (e.g., documents) by using external indicators independent of the contents of the target objects is proposed, and thus, intentional abusing of producers of the objects can be prevented. As a method of measuring the importance of the object using an external indicator, there are methods of using a hit number (in case of web document), a citation number (in case of thesis), or the like according to the type of document.

Since large document sets are likely to consist of various documents, fine-grained clustering for data mining or deep analysis, multi-labeling for assigning 0 to n clusters to a document, and non-labeling-labeling (e.g., for spam documents) are required. Accordingly, an exemplary embodiment according to the present disclosure formally defines a network and proposes a probability-based generation model for clustering to enable multi-labeling and non-labeling.

Document embedding is a method of measuring a semantic distance between documents by projecting the documents onto a vector space. Therefore, the performance of document embedding is very important for tasks such as document clustering, searching, and document classification to group similar documents. Various document-embedding methods have been proposed, including frequency-based document embedding, neural-network-based document embedding, and topic-modeling-based document embedding. Currently, neural-network-based document embedding is being used widely, and there have been numerous studies on the optimization of document embedding based on the task at hand.

The present disclosure improves clustering performance by proposing a new network embedding method considering significance of objects and relationships between the objects, which is suitable for network-based clustering. The proposed method uses a new objective function that can reflect the significance of objects based on their ranking.

Network-Based Clustering

The network-based clustering is an unsupervised method for clustering semantically similar documents. Methods for embedding target objects in a vector space and finding their neighbors in that space, and semantic clustering methods based on salient word extraction are used widely.

However, these methods assume that all the objects are independent and do not consider the strength of the relationships between them. In order to overcome this limitation, network-based document clustering that considers these relationships as well as the significance of the individual objects has been researched extensively. The network-based clustering regards objects as interconnected networks and performs document clustering according to the characteristics of these networks. These networks are defined as graphs consisting of vertices (i.e., each corresponding to a document) connected by edges. In general, it is assumed that there will be semantic relationships between documents linked directly or indirectly in the document network. Based on this assumption, the significance (i.e., authority) and link strength of the documents are measured, and clustering is performed based on these parameters.

The network-based clustering began with classification of hyperlinked web documents. The network-based clustering uses various types of metadata and has been applied to a range of documents. For example, the network-based clustering is used to plot graphs and classify articles based on their citations, authors, and academic societies, or to determine semantic relevance in case of news. When linking documents, words shared between documents as well as metadata can be used. Hence, documents can be clustered based on the dependent relationships that exist between them in the network, even when the amount of metadata is low or the metadata are absent completely.

Also, the existing studies formally define a network and propose a probability generation model and apply it to paper clustering. However, in the existing studies, the multi-labeling clustering in which one object is allocated to multiple clusters or non-labeling clustering in which one object is not allocated to any cluster was impossible. Further, the existing scheme is unsuitable for a domain where several million highly complex documents such as mobile apps exist and specific documents should be allocated to multiple clusters or should not be allocated to any cluster (e.g., spam documents).

Accordingly, the present disclosure proposes a network-based clustering method that facilitates multi-labeling. To build a neighbor graph weight matrix to measure the relationship strength between the objects during the network-based clustering process, nonnegative matrix factorization (NMF) and concept factorization (CF) have been used. Furthermore, various types of ranking information such as the search rank in search engines, hubness value, citation information for paper classification, and a journal rank are used to measure the significance of documents and the link strength between them. The hubness value is the most widely used metric for measuring the significance of documents. For example, the PageRank and HITS algorithms analyze the graphs of web pages to search documents, and assign a higher authority value to those that have a larger number of inlinks.

However, these methods favor old documents and allocate a low authority value to new documents. To address this problem, a meaning-based search engine was used to reflect the meaning-related information in the significance of documents and single out unimportant ones, thereby increasing the processing speed. However, search-engine-based significance analysis ranks documents based on their semantic relevance and focuses on their internal-meaning-related information. One disadvantage of this method is that is it prone to the problem of abusing, which refers to the intentional inclusion of important words irrelevant to the content of the actual documents. Exemplary embodiments of the present disclosure use a method for measuring the significance of objects (e.g., documents or mobile applications) based on indices that are completely independent of the content of the objects in question, thereby essentially blocking such the abusing problem.

Document-Embedding-Based Clustering

The document embedding is a task of embedding a document consisting of a word set T into a latent vector. Many document clustering methods calculate the distances between documents and subsequently cluster similar documents based on the document embedding. A well-known document embedding method includes a vector space model based method of embedding a latent vector using a term frequency, an inverted document frequency, or the like. Topic modeling-based document embedding using latent Dirichlet allocation (LDA) is one of the popular methods. For example, the document clustering was performed by applying the topic modeling-based document embedding is applied to the K-means algorithm. In another study, for the topic-modeling-based embedding, the performance of topic modeling was improved by measuring the significance of documents based on their network, and determining weights of the documents links, and such the improved network based topic modeling was then used for document clustering.

In addition, active research is underway on embedding documents or words using neural networks. Representative neural-network-based embedding methods are Word2Vec which predicts the neighboring words of the input words, and Doc2Vec which predicts the words present in the input documents. Recently, research has been published that extends Word2Vec and Doc2Vec and improves embedding performance by considering context or using external or internal information. EMLO uses a bidirectional LSTM to take context into consideration and learn word embedding to enable word disambiguation. Some researches have improved the document-embedding method that targeted document clustering. In this case, the document-clustering performance could be improved by using a semi-supervised method that involved building initial clusters based on words and increasing the similarity between the documents in a given cluster through learning. Exemplary embodiments of the present disclosure propose a novel document-embedding method that reflects the significance of the documents in question based on their ranking by using external indices for network-based document clustering. This facilitates high-performance document embedding based on the simultaneous use of the semantic information present in the documents, the network information, and the document metadata.

Network Model Definition

An objective of the present disclosure is to cluster documents or networks through network embedding. Hereinafter, definition of a problem of network-based document clustering that allows for multi-labeling, and relevant concepts and notations will be described. Unlike the existing invention, the network defined in the present disclosure facilitates the multi-labeling, and thus, each document may be assigned to multiple clusters.

(Def1). Information Network: The information network graph is defined as G=<V,E,W>, where V are objects belonging to the network, E are edges representing the binary relation between a node pair belonging to the network, and $W: E \to \mathbb{R}^+$ is the weight mapping of edge e (e∈E) and is a real number.

The information network is a linked network of objects. For example, with respect to the clustering of mobile apps, each app corresponds to an object, and when apps $x_i$, $x_j$ are correlated (e.g., when the same word is shared in the titles of $x_i$ and $x_j$), an edge $e_k$ exists between them. $e_k$ has a higher weight $w_k$ if the relationship strength between $x_i$ and $x_j$ is greater. For example, if the words shared in the titles of $x_i$ and $x_j$ are very important words, $w_k$ is high, and if there are no words shared or the shared words are stop words, $w_k$ is close to zero.

(Def2). Probabilistic Network Clustering: For a network G, a probability cluster C is defined as C=<G', $P_X^C$>, where G' is a subnetwork of G, and $P_X^C$ indicates the set of probability of x∈V(G') when x∈X, X=V(G).

$P_{x_i}^{C_k}$, which is the probability that an object $x_i$ belongs to cluster $C_k$, has a value between 0 and 1, and $0 \le \Sigma_{k=1}^{K} P_{x_i}^{C_k} \le K$, where K is the number of clusters. Clusters are independent of each other. Thus, object x may be allocated to every cluster with a maximum probability of 1. This facilitates multi-labeling based on comparisons of the threshold of the probability value. In contrast, in most existing studies, the probability that an object is allocated to a cluster was dependent, and is defined as $\Sigma_{k=1}^{K} P_{x_i}^{C_k}=1$. In these cases, each object was allocated exclusively to a single cluster, and multi-labeling was not possible. When K clusters $C_1, C_2, \ldots, C_k$ are given, $U_{k=1}^{K} C_k \ne V(G)$. That is, there is an object $x_i$ that is not assigned to any cluster. This means that when there are very exceptional or noise objects, there is no need to forcibly assign an object to a specific cluster, unlike the existing methods of forcibly assigning an object to a specific cluster or having a separate cluster for exception handling.

Probabilistic Generative Model for Enabling Multi-Labeling

As per existing studies, an object with a higher significance in the network has more links to other objects, because many more objects refer to the important objects. Furthermore, an object with a higher significance has a higher probability of being adjacent to the central object of the cluster. This explains the phenomenon that the other objects intuitively refer to, or are created by referring to, the objects with high significance. For example, there are papers that are derived from other papers that have received much more attention and have been cited more often in the literature. Similarly, there exist mobile apps or related documents that have been created by referring to more popular mobile apps. Based on this observation, the present disclosure proposes a network-clustering method by calculating the probabilistic generative model p(x|G) for network clustering.

As described above in Def1, in the network objects linked with an edge has a relationship strength according to the edge weight. Accordingly, it is assumed that the probability of visiting object x in the graph G is proportional to the sum of the probabilities of visiting the neighbors of x, as shown in Equation 1:

$$p(x \mid G) \propto \sum_{x_j \in N_G(x)} p(x_j \mid G)^{w_{x,x_j}} \qquad \text{[Equation 1]}$$

Here, $N_G(x)$ denotes a set of the neighbors of object x in the graph G, and $w_{x,x_j}$ denotes the edge weight of x and its neighbor $x_j$. Thus, the posterior probability that object $x_i$ belongs to network $G_k$ may be calculated using the Bayesian rule as shown in Equation 2 and Equation 3.

$$p(G_k \mid x_i) = p(x_i \mid G_k) \times p(G_k) / p(x_i) \qquad \text{[Equation 2]}$$

$$p(G_k \mid x_i) \propto \sum_{x_j \in N_{G_k}(x)} p(x_j \mid G_k)^{w_{x_i,x_j}} \times p(G_k) \qquad \text{[Equation 3]}$$

Here, it is assumed that all the values of $p(x_i)$ are identical; thus, they are ignored in Equation 3. $w_{x_j,x_i}$ denotes the relationship strength between $x_i$ and $x_j$. A close neighbor with a higher relationship strength has greater influence on the posterior probability. Furthermore, as mentioned above, the higher the significance of $x_j$, the higher the probability of visiting $x_j$ in $G_k$. Hence, using function $f_{RS}(x_i, x_j)$, which considers the relationship strength of two objects and their significance, $p(X_j|G_k)^{w_{x_i,j}^x}$ $$p(X_j|G_k)^{w_{x_i,j}^x} = f_{RS}(X_i, X_j) \times p(X_j|G_k) \quad \text{[Equation 4]}$$

In Equation 4, the probability of visiting $x_j$ in graph $G_k$, $p(x_j|G_k)$, may also be calculated by comparing the similarity and significance of $G_k$ and $x_j$ as with $w_{x_i,x_j}$. To compare object $x_j$ with graph $G_k$, the average value of the objects that belong to $G_k$ may be compared with $x_i$.

$$p(X_j|G_k)^{W_{x_i,j}^X} = f_{RS}(X_i, X_j) \times f_{RS}(X_j, \text{Avg}(V(G_k))) \quad \text{[Equation 5]}$$

Using Equations 2 to 5, a score function proportional to the posterior probability that object $x_i$ belongs to cluster $C_k$ may be determined as shown in Equation 6.

$$\text{Score}(C_k, x_i) = \quad \text{[Equation 6]}$$
$$\frac{|V(G_k)|}{|V(G)|} \sum_{x_j \in N_{G_k}(x)} f_{RS}(x_i, x_j) \times f_{RS}(x_j, \text{Avg}(V(G_k)))$$

In Equation 6, $p(G_k)$ is determined by dividing the number of objects that belong to $G_k$ by the total number of objects. Equation 6 expresses the probability that object x belongs to cluster C as a score that is proportional to the significance and relationship strength of the object.

Ranking-Based Network Embedding Learning

Hereinafter, a method of learning the function $f_{RS}$ representing the significance and the relationship strength (similarity) described above by using the ranking based network embedding learning (Net2Vec) algorithm proposed by the present disclosure will be described. The function $f_{RS}$ expressing significance and relationship strength (similarity) may be learned using the Net2Vec algorithm, which is an improvement of the well-known Word2Vec algorithm for word or document embedding. The Net2Vec algorithm is used to compare the relationship strength of the documents in question while considering their significance based on their ranking information during optimization.

Figure 2:
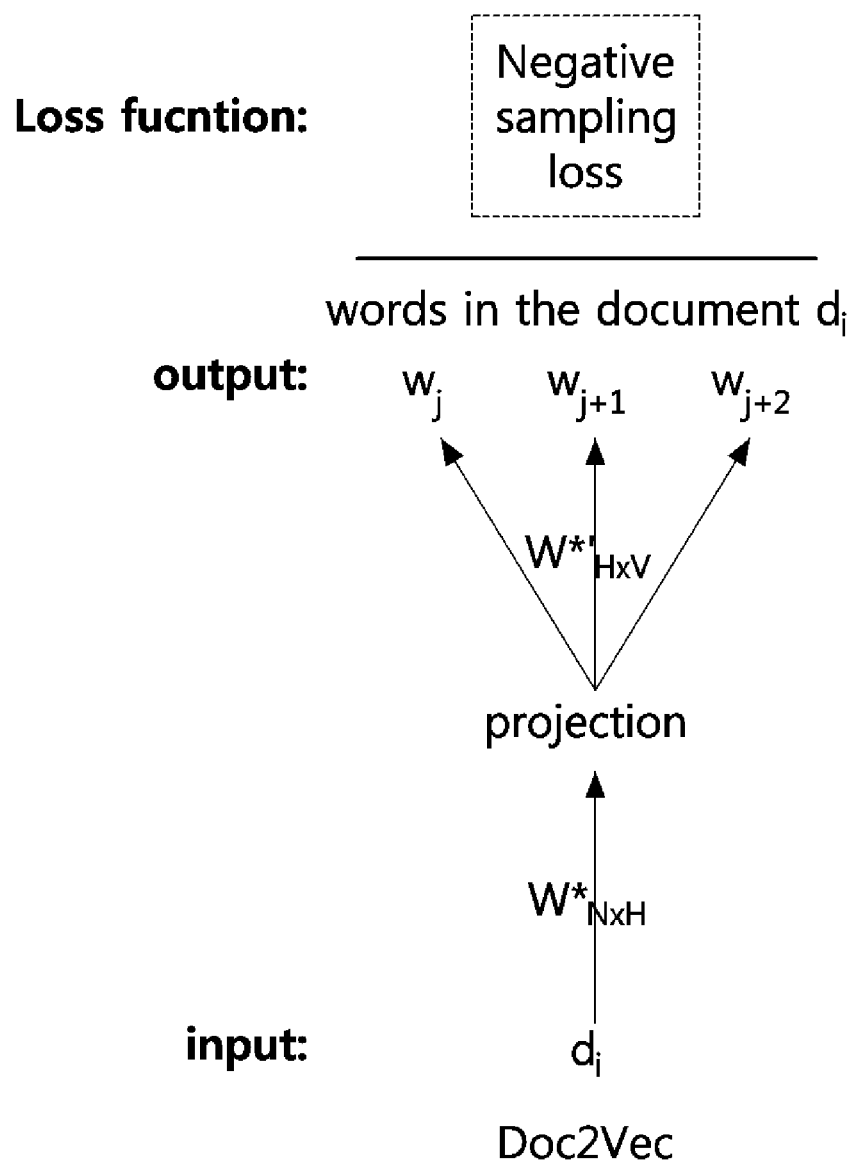
FIG. 2 is a conceptual diagram illustrating a Doc2Vec algorithm.
Figure 3:
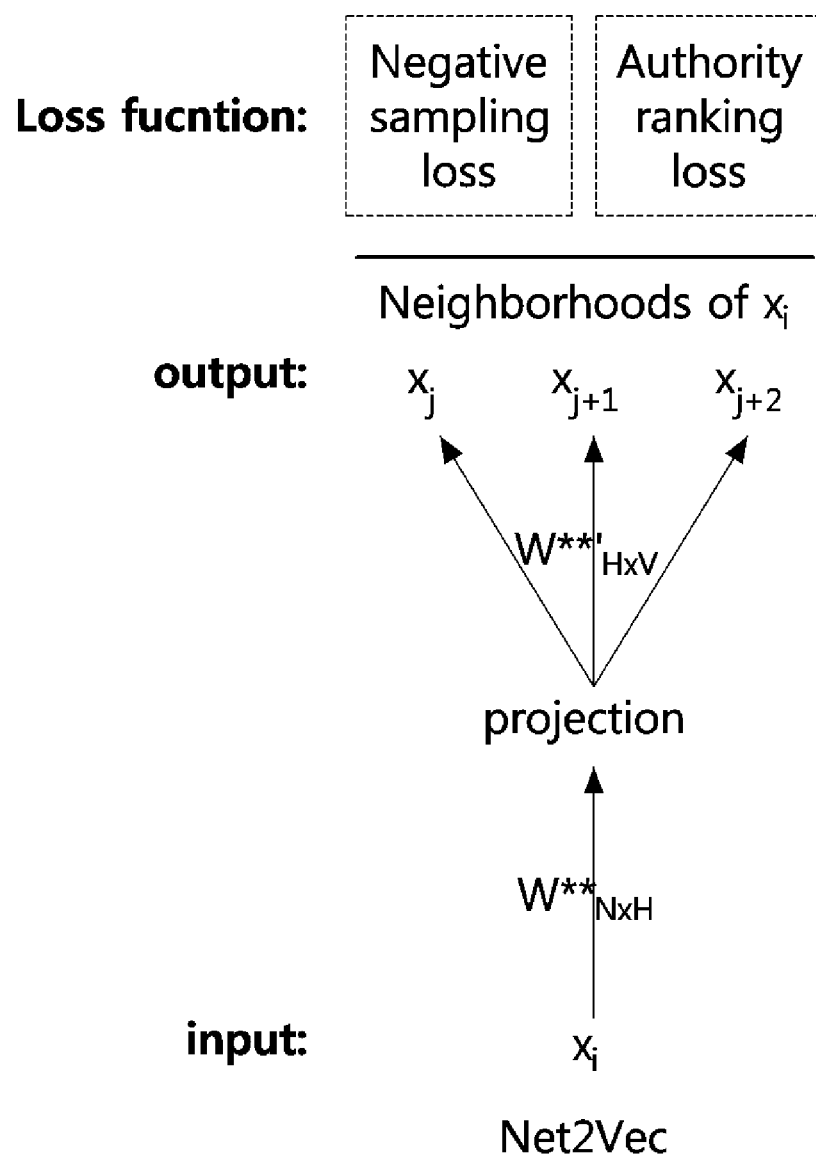
FIG. 3 is a conceptual diagram illustrating a Net2Vec algorithm according to the present disclosure.

FIG. 1 is a conceptual diagram illustrating a Word2Vec algorithm, FIG. 2 is a conceptual diagram illustrating a Doc2Vec algorithm, and FIG. 3 is a conceptual diagram illustrating a Net2Vec algorithm according to the present disclosure.

As shown in FIG. 1, the Word2Vec algorithm learns to predict the context words $w_j, w_{j+1}, \ldots, w_{j+n}$ of the input word $w_i$, which belongs to the word set w consisting of V words by using a neural-network-based model that comprises an input layer, a projection layer, and an output layer. This may be expressed as shown in Equation 7 and Equation 8 below $$\frac{1}{T} \sum_{t=1}^{T} \sum_{w_j \in ow(w_i)} bgP(w_j|w_i) \quad \text{[Equation 7]}$$

$$\log P(w_j|w_i) = \frac{\exp^{E'^T_{w_j} E_{w_i}}}{\sum_{w_{j'} \in Vocab} \exp^{E'^T_{w_{j'}} E_{w_i}}} \quad \text{[Equation 8]}$$

In Equation 8, $E_{w_i}$ is a vector corresponding to the weight matrix W matched with the input word $w_i$ in FIG. 2, and $E'w_j$ is the vector for the output word w obtained using the weight matrix W'. When a corpus T is given, the Word2Vec algorithm learns to maximize the log probability of Equation 7 and obtains a weight matrix to be used as the latent vector for the word. To efficiently calculate the denominator of Equation 8, a negative sampling loss function may be used.

While Word2Vec is a technique for embedding words, Doc2Vec is a technique for embedding documents, paragraphs, or sentences. As shown in FIG. 2, the Doc2Vec algorithm receives document $d_i$, which belongs to the document set d with N documents, as the input and learns to predict the words $w_j, w_{j+1}, \ldots, w_{j+n}$ that belong to document $d_i$ by using a neural-network-based model that comprises an input layer, a projection layer, and an output layer.

Meanwhile, the Net2Vec algorithm proposed in the present disclosure uses a neural network model composed of an input layer, a projection layer, and an output layer as shown in FIG. 3. The neural network is trained to receive $x_i$, which is an object belonging to the network (i.e., target of the clustering, e.g., document), and predict neighboring objects $x_j, x_{j+1}, \ldots, x_{j+n}$ of $x_i$. The vector of object $x_i$ may be determined using the weight matrix $W^{**'}$, as is also the case for the Word2Vec and Doc2Vec algorithms. The proposed algorithm optimizes Equation 9 to predict the neighboring objects of the input object while considering the relationship strength $ww_{x_i,x_j}$ between the objects.

$$\sum_{x_i \in V(G)} \sum_{x_j \in V(G)} \log P(x_j|x_i)^{w_{x_i,x_j}} \quad \text{[Equation 9]}$$

$$\log P(x_j|x_i) = \frac{\exp^{E'^T_{x_j} E_{x_i}}}{\sum_{x_{j'} \in V(G)} \exp^{E'^T_{x_{j'}} E_{x_i}}} \quad \text{[Equation 10]}$$

In the present disclosure, the concept of authority ranking loss is introduced to reflect the strengths of the relationships between the important objects. The authority ranking loss reflects the fact that an object with a higher significance has a higher probability to be visited by the network as compared to an object with a lower significance. Thus, $x_j$, a neighbor of $x_i$ that has a low significance is penalized so that objects with a higher significance can be predicted with a higher probability.

For the significance, various metrics such as the ranking and frequency of the object in question (e.g., document) may be considered based on the characteristics of the data set. For example, for mobile apps, the download ranking may be used as the significance. Equation 11 represents the authority ranking score (ARS) function.

$$ARS(x_i) = R(x_i) \times \frac{\sum_{x_j \in N_G(x_i)} R(x_j) \times \text{sim}(x_i, x_j)}{|N_G(x_i)|} \quad \text{[Equation 11]}$$

Here, $R(x_i)$ is the ranking score of $x_i$, which is simply the sum of the reciprocals of the rankings during the given period. In other words, the first place is given one point, the second place is given 0.5 points, and so on. Then, for the given period, the rankings of the objects are added. For the normalization function, min-max normalization is used. sin $(x_i, x_j)$ measures the similarity between $x_i$ and $x_j$ by comparing the cosine similarities of the $x_i$ and $x_j$ vectors. This similarity is used to determine the relationship strength between the objects. Thus, the higher the significance of the object $x_j$ with a high similarity, the higher is the ARS of $x_i$.

To address the constraint optimization problem, the proposed model uses a penalty term of the object function as the constraint. This may be expressed as shown in Equation 12.

$$O' = O - \eta(1 - ARS(x_i, x_j)) \quad \text{[Equation 12]}$$

The proposed model is normalized through negative sampling. The negative sampling method learns by randomly extracting positive examples and more negative examples from the total set. For the negative examples, a high penalty is given if the similarity, $sim(x_i, x_j)$, between the input and output objects is high, and the significance of the output object, $x_j$, is high. Further, the opposite applies in the case of the positive examples. A higher penalty is given for false predictions if the significance is higher because an object with a higher significance is considered as being more representative of that specific cluster. This has the effect of ensuring that the embedding vector is trained so that the cluster and the input object move farther apart. Based on network object embedding using the object function given in Equation 12, the latent vector, $E_x$, of x is trained to be closer to a neighboring object that has a high significance.

Therefore, $f_{RS}(x_i, x_j)$ in Equations 4 to 6 may be expressed as a function for measuring the distance between the latent vectors of two objects using their cosine similarity. Finally, the similarity between the objects (documents) may be calculated by calculating the posterior probability using the score function shown as Equation 6.

Clustering Method According to the Present Disclosure

Figure 4:
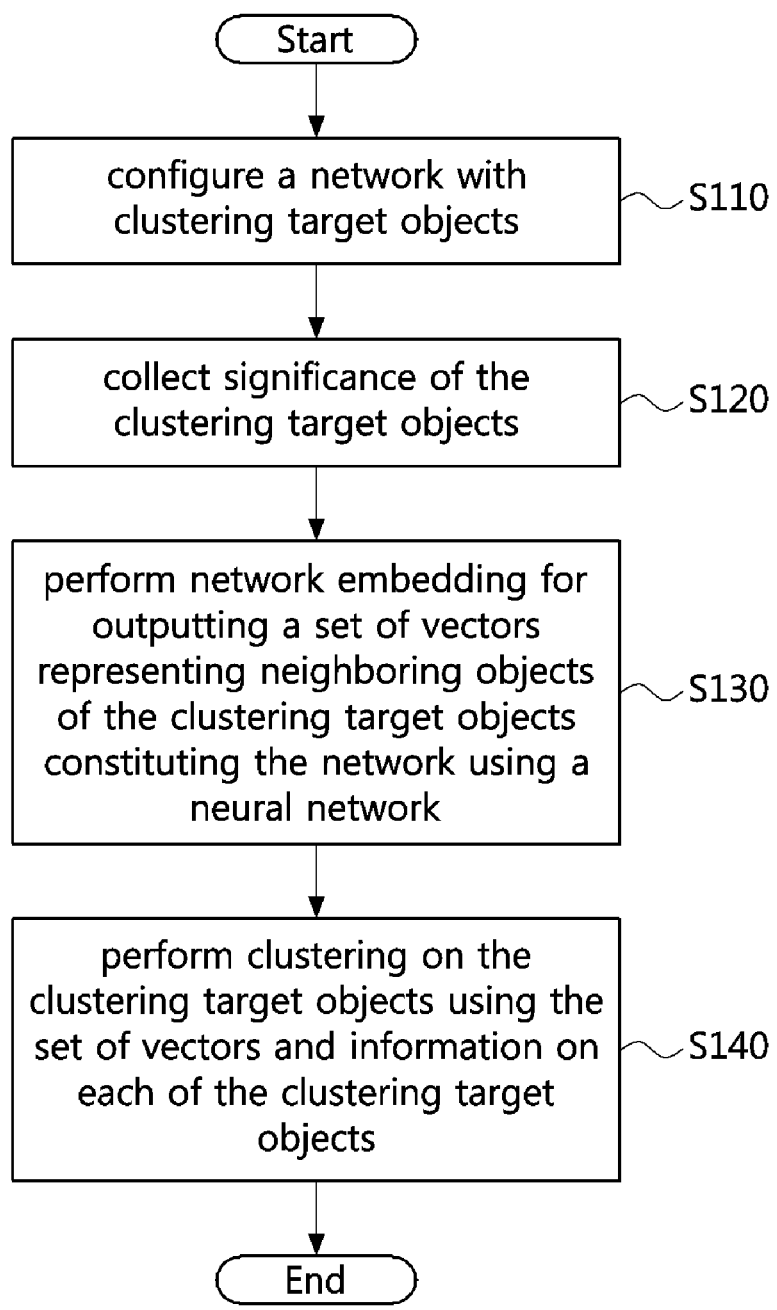
FIG. 4 is a flowchart illustrating a clustering method using ranking-based network embedding according to an exemplary embodiment of the present disclosure.

FIG. 4 is a flowchart illustrating a clustering method using ranking-based network embedding according to an exemplary embodiment of the present disclosure.

In FIG. 4, a method of performing clustering using a network model, a probability generation model, ranking-based network embedding, and neural network learning therefor is described.

The clustering method according to an exemplary embodiment of the present disclosure may be performed by an apparatus consisting of a processor and a memory or a storage device storing at least one instruction executable by the processor. The detailed configuration of the apparatus will be described later with reference to FIG. 5.

Referring to FIG. 4, a clustering method according to an exemplary embodiment of the present disclosure may comprise a step S110 of configuring a network with clustering target objects; a step S120 of collecting significance of the clustering target objects; a step S130 of performing network embedding for outputting a set of vectors representing neighboring objects of the clustering target objects constituting the network using a neural network; and a step S140 of performing clustering on the clustering target objects using the set of vectors and information on each of the clustering target objects.

As described above, the clustering target objects may be documents or mobile applications. That is, since the clustering method according to the present disclosure does not refer to the content of the target object, there is no limitation on the objects to be clustered.

Here, in the step S110, the network may be defined as G=<V, E, W>, V may represent the clustering target objects belonging to the network, E may represent edges representing binary relations of pairs of the clustering target objects belonging to the network, and W:E→ℝ⁺ may represent real value weight mappings for edges e (e∈E).

Also, in the step S140, the clustering may be performed using a score function proportional to a posterior probability that an object $x_i$ belongs to a cluster $C_k$ which is described in Equation 6. For example, when a value of the score function calculated for the object $x_i$ is greater than or equal to a predetermined threshold, it may be determined that the object $x_i$ belongs to the cluster $C_k$. Alternatively, the object $x_i$ may be determined to belong to the cluster $C_k$ when the value of the score function calculated for the object $x_i$ is greater than or equal to an average value of the score function calculated for other objects or greater than the average value by a predetermined difference.

Specifically, the score function may be represented by $$\text{Score}(C_k, x_i) = \frac{|V(G_k)|}{|V(G)|} \sum_{x_j \in N_{G_k}(x)} f_{RS}(x_i, x_j) \times f_{RS}(x_j, Avg(V(G_k))).$$

Here, $N_G(x)$ may represent a set of neighboring objects $x_j$ of the object $x_i$ in the network G, $f_{RS}(x_i, x_j)$ may represent a function representing similarity and significance of the objects $x_i$ and $x_j$, $V(G_k)$ may represent objects belonging to a graph $G_k$ corresponding to the cluster $C_k$, V (G) may represent all objects belonging to the network G, and $f_{RS}(x_j, Avg(V(G_k)))$ may represent average similarity and significance between the object $x_i$ and the objects belonging to the graph $G_k$.

As described above, since the score function of Equation 6 is based on the probability model described through Equations 2 to 5, the score function of Equation 6 may be used to determine whether each object belongs to each cluster. That is, it may be determined for each cluster. Thus, multi-labeling in which one object is determined to belong to a plurality of clusters, and non-labeling in which one object is determined to not belong to any cluster are possible.

Meanwhile, $f_{RS}$ in the score function may be learned by the Net2Vec algorithm, and the Net2Vec algorithm trains the neural network by using information on the significance of the clustering target objects so as to maximize probabilities that neighboring objects having high significance are predicted.

The Net2Vec algorithm may use an authority ranking loss function to induce learning so that an object having high significance is predicted with a higher probability by giving a penalty as significance of a neighboring object of a clustering target object is lower.

As described in Equation 11, the signification may be represented by an authority ranking score (ARS) function, $$ARS(x_i) = R(x_i) \times \frac{\Sigma_{x_j \in N_G(x_i)} R(x_j) \times sim(x_i, x_j)}{|N_G(x_i)|} = f_{RS}(x_j, Avg(V(G_k))).$$

$R(x_i)$ may be a rank score of $x_i$, $sin(x_i, x_j)$ may be a cosine similarity representing a distance between latent vectors of $x_i$ and $x_j$, and $N_G(x)$ may represent a set of neighboring objects $x_j$ of the object $x_i$ in the network G.

Clustering Apparatus According to the Present Disclosure

Figure 5:
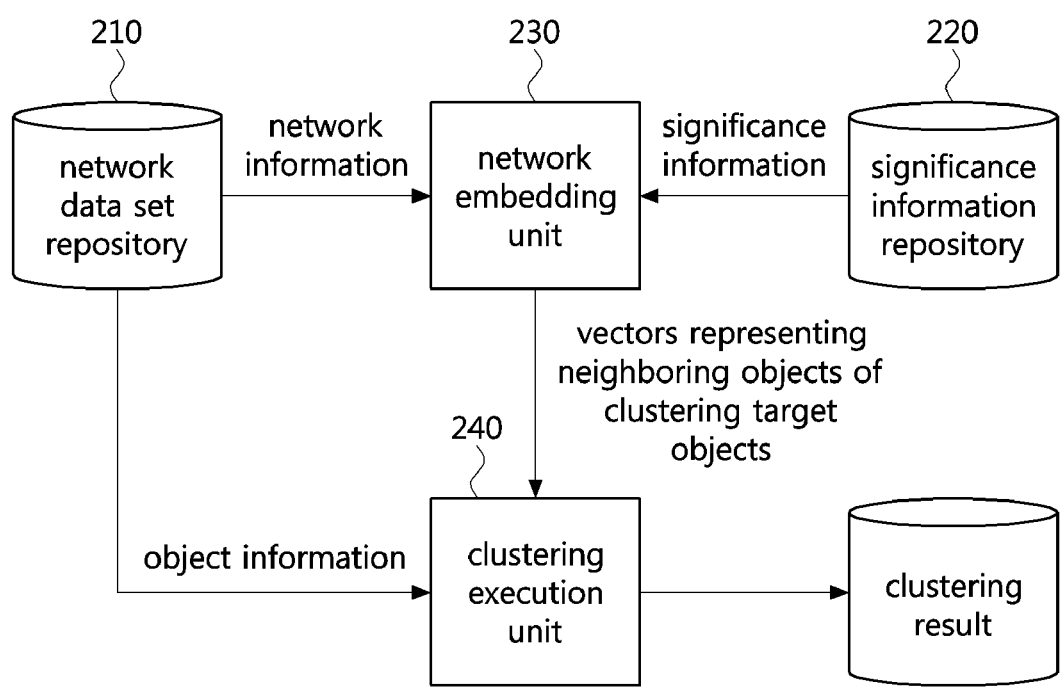
FIG. 5 is a block diagram illustrating a clustering apparatus using ranking-based network embedding according to an exemplary embodiment of the present disclosure.

FIG. 5 is a block diagram illustrating a clustering apparatus using ranking-based network embedding according to an exemplary embodiment of the present disclosure.

Referring to FIG. 5, a clustering apparatus according to an exemplary embodiment of the present disclosure may be configured to comprise a network data set repository 210, a significance information repository 220, a network embedding unit 230, and a clustering execution unit 240.

As described above with reference to FIG. 4, the clustering apparatus according to an exemplary embodiment of the present disclosure may be configured with a processor and a memory or a storage device storing at least one instruction executable by the processor.

Accordingly, the configuration of the apparatus illustrated in FIG. 5 represents conceptual functional elements of the clustering apparatus according to an exemplary embodiment of the present disclosure, and may be variously configured according to various exemplary embodiments of the present disclosure.

First, the network data set repository 210 may store a data set of clustering target objects that may be represented as a network, such as web pages or papers. That is, each object included in the data set stored in the network data set repository 210 may be a target of clustering. Meanwhile, the significance information repository 220 may store ranking information (significance information) of objects constituting the network. The network data set repository 210 and the significance information repository 220 may be located in the memory or storage described above.

The network embedding unit 230 may read information on the network from the network data set repository 210, and analyze and learn the information to perform an embedding operation of converting objects belonging to the network into a vector. In this case, the network embedding unit 230 includes a neural network, and the neural network has a maximum probability of predicting a neighboring object having a high rank (significance) using the rank (significance) information of the objects provided from the significance information repository 220.

The clustering execution unit 240 may cluster the objects (e.g., documents) by using the set of vectors representing neighboring objects of the clustering target objects output from the network embedding unit 230 and information on each of the clustering target objects. For example, the clustering execution unit 240 may use one of various existing clustering algorithms such as K-means and may use the set of vectors to calculate the similarity of objects.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. A clustering method comprising:
   configuring a network with clustering target objects;
   collecting significance of each of the clustering target objects;
   outputting a vector of neighboring clustering target objects of each of the clustering target objects constituting the network using a neural network; and
   performing clustering on each of the clustering target objects using similarity and significance of each of the clustering target objects and the neighboring clustering target objects belonging to the vector of the neighboring clustering target objects of each of the clustering target objects,
   wherein the neural network is trained so that neighboring clustering target objects having high significance are output with higher probability,
   wherein the network is defined as G=<V, E, W>, where V are the clustering target objects belonging to the network, E are edges representing binary relations of pairs of the clustering target objects belonging to the network, and W:E→$\mathbb{R}^+$ are real value weight mappings for edges e (e ∈ E).

2. The clustering method according to claim 1, wherein the clustering target objects are documents or mobile applications.

3. The clustering method according to claim 1, wherein the clustering is performed using a score function proportional to a posterior probability that a clustering target object $x_i$ belongs to a cluster $C_k$, the score function is represented by $$\text{Score}(C_k, x_i) = \frac{|V(G_k)|}{|V(G)|} \sum_{x_j \in N_{G_k}(x)} f_{RS}(x_i, x_j) \times f_{RS}(x_j, Avg(V(G_k))),$$

represents a vector of neighboring clustering target objects $x_j$ of the clustering target object $x_i$ in the network G, $f_{RS}(x_i, x_j)$ represents a function representing similarity and significance of the clustering target objects $x_i$ and $x_j$, $V(G_k)$ represents clustering target objects belonging to a graph $G_k$ corresponding to the cluster $C_k$, V(G) are all clustering target objects belonging to the network G, and $f_{RS}(x_j, Avg(V(G_k)))$ represents average similarity and significance between the clustering target object $x_i$ and the clustering target objects belonging to the graph $G_k$.

4. The clustering method according to claim 3, wherein $f_{RS}$ is learned by a Net2Vec algorithm, and the Net2Vec algorithm trains the neural network by using information on the significance of the clustering target objects so as to maximize probabilities that neighboring clustering target objects having high significance are predicted.

5. The clustering method according to claim 4, wherein the Net2Vec algorithm uses an authority ranking loss function to induce learning so that neighboring clustering target objects having high significance are predicted with a higher probability by giving a penalty as significance of a neighboring clustering target object of the clustering target object $x_j$ is lower.

6. The clustering method according to claim 1, wherein the signification is represented by an authority ranking score (ARS) function, $$ARS(x_i) = R(x_i) \times \frac{\sum_{x_j \in N_G(x_i)} R(x_j) \times \sin(x_i x_j)}{|N_G(x_i)|} = f_{RS}(x_j, Avg(V(G_k))),$$

$R(x_i)$ is a rank score of the clustering target object $x_i$, $\sin(x_i x_j)$ is a cosine similarity representing a distance between latent vectors of the clustering target objects $x_i$ and $x_j$, and $N_G(x)$ represents a vector of neighboring clustering target objects $x_j$ of a clustering target object $x_i$ in the network G.

7. The clustering method according to claim 6, wherein when the clustering target objects are mobile applications, $R(x_i)$ is obtained through min-max normalization on a sum of reciprocals of download ranks for a given period.

8. A clustering apparatus comprising at least one processor and a memory storing at least one instruction executable by the at least one processor, wherein when executed by the at least one processor, the at least one instruction is configured the at least one processor to:
configure a network with clustering target objects;
collect significance of each of the clustering target objects;
output a vector of neighboring clustering target objects of each of the clustering target objects constituting the network using a neural network; and
perform clustering on each of the clustering target objects using similarity and significance of each of the clustering target objects and the neighboring clustering target objects belonging to the vector of the neighboring clustering target objects of each of the clustering target objects,
wherein the neural network is trained so that neighboring clustering target objects having high significance are output with higher probability,
wherein the network is defined as G=<V, E, W>, where V are the clustering target objects belonging to the network, E are edges representing binary relations of pairs of the clustering target objects belonging to the network, and W:E→$\mathbb{R}^+$ are real value weight mappings for edges e (e ∈ E).

9. The clustering apparatus according to claim 8, wherein the clustering target objects are documents or mobile applications.

10. The clustering apparatus according to claim 8, wherein the clustering is performed using a score function proportional to a posterior probability that a clustering target object $x_i$ belongs to a cluster $C_k$, the score function is represented by $$Score(C_k, x_i) = \frac{|V(G_k)|}{|V(G)|} \sum_{x_j \in N_{G_k}(x)} f_{RS}(x_i, x_j) \times f_{RS}(x_j, Avg(V(G_k))),$$

$N_G(x)$ represents a vector of neighboring clustering target objects $x_j$ of the clustering target object $x_i$ in the network G, $f_{Rs}(x_i, x_j)$ represents a function representing similarity and significance of the clustering target objects $x_i$ and $x_j$, $V(G_k)$ represents clustering target objects belonging to a graph $G_k$ corresponding to the cluster $C_k$, V(G) are all clustering target objects belonging to the network G, and $f_{Rs}$ Avg($V(G_k)$) represents average similarity and significance between the clustering target object $x_i$ and the clustering target objects belonging to the graph $G_k$.

11. The clustering apparatus according to claim 10, wherein $f_{Rs}$ is learned by a Net2Vec algorithm, and the Net2Vec algorithm trains the neural network by using information on the significance of the clustering target objects so as to maximize probabilities that neighboring clustering target objects having high significance are predicted.

12. The clustering apparatus according to claim 11, wherein the Net2Vec algorithm uses an authority ranking loss function to induce learning so that neighboring clustering target objects having high significance are predicted with a higher probability by giving a penalty as significance of a neighboring clustering target object of the clustering target object $x_i$ is lower.

13. The clustering apparatus according to claim 8, wherein the signification is represented by an authority ranking score (ARS) function, $$ARS(x_i) = R(x_i) \times \frac{\Sigma_{x_j \in N_G(x_i)} R(x_j) \times sim(x_i, x_j)}{|N_G(x_i)|} = f_{RS}(x_j, Avg(V(G_k))),$$

$R(x_i)$ is a rank score of the clustering target object $x_i$, $sim(x_i, x_j)$ is a cosine similarity representing a distance between latent vectors of the clustering target objects $x_i$ and $x_j$, and $N_G(x)$ represents a vector of neighboring clustering target objects $x_j$ of a clustering target object $x_i$ in the network G.

14. The clustering apparatus according to claim 13, wherein when the clustering target objects are mobile applications, $R(x_i)$ is obtained through min-max normalization on a sum of reciprocals of download ranks for a given period.

* * * * *